Patented Jan. 9, 1940

2,186,421

UNITED STATES PATENT OFFICE 2,186,421

PROCESS FOR THE MANUFACTURE OF MERCAPTOTHIAZOLES

Roger A. Mathes, Akron, Ohio, assignor to The B. F. Goodrich Company, New York, N. Y., a corporation of New York No Drawing. Application September 29, 1938, Serial No. 232,391

10 Claims. (Cl. 260—302)

This invention relates to an improved process for the manufacture of mercaptothiazoles.

The object of the invention is to provide a commercially useful method for the manufacture of mercaptothiazoles at an economical cost. This object is accomplished by an improved technique for carrying out the reaction, making possible, with an inexpensive process, the preparation of mercaptothiazoles of high purity and in good yields.

According to my invention a dithiourethane, capable of being transformed into a mercaptothiazole by splitting off water, is heated in water to form a mercaptothiazole. The dithiourethane is first formed by reacting in an organic solvent ammonium or an alkali metal dithiocarbamate and an alpha halogenated organic compound. The reaction may be represented in the following manner:

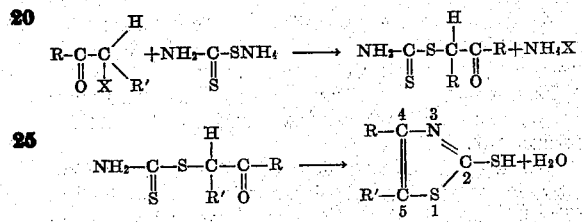

where R is a hydrocarbon group which may be joined to R'; R' is hydrogen, an alkyl group which may be joined to R, or a carbalkoxy group; and X is halogen.

A method described in the literature provides for direct heating to transform the mercaptothiazole-forming dithiourethane into a mercaptothiazole. Such a method has the disadvantage that the product is in the form of a cake, an undesirable physical condition. Furthermore, the product is contaminated with ammonium chloride which must be removed.

One of the most significant advantages of my process is that the mercaptothiazole is obtained in a finely-divided condition, resulting from heating the dithiourethane in water. At the same time ammonium chloride is taken into solution and is discarded with the filtrate. The solubility of the mercaptothiazole in water is negligible.

An alpha halogenated organic compound of the general formula

is added to a suspension of ammonium dithiocarbamate in an organic solvent. A reaction takes place, usually without the necessity of applying heat, and a dithiourethane is formed along with ammonium chloride. These products are filtered off and the filter cake, either dry or still wet with the organic solvent, is added to water and heat is applied with agitation. The dithiourethane is transformed to a mercaptothiazole during which process water is split off. The mercaptothiazole is filtered off, washed and dried.

Among the alpha halogenated organic compounds which may be used in my process are the alpha halogenated ketones as monochloroacetone, 1-chlorobutanone-2, 3-chlorobutanone-2, 3-chloropentanone-2, phenacylchloride, p-methylphenacyl chloride, alpha chlorocyclohexanone, alpha chlorocyclopentanone. A mixture of 1-chlorobutanone-2 and 2-chlorobutanone-3, such as is obtained by the chlorination of 2-butanone, may also be used.

This invention is not necessarily restricted to the use of alpha halogenated ketones. Other alpha halogenated organic compounds as the alpha halogenated beta ketonic esters are also useful materials. Among this class of compounds are ethyl alpha chloroacetoacetate and methyl alpha chloroacetoacetate.

While ammonium dithiocarbamate is the preferred reactant for use with the alpha halogenated organic compounds, due to its availability, alkali metal salts of dithiocarbamic acid, as the sodium and potassium salts, are equally as satisfactory.

In general, the mercaptothiazole-forming dithiourethanes are not appreciably soluble in the more desirable organic solvents for use as diluents. The dithiourethanes may thus be filtered off along with the by-product ammonium or alkali metal chlorides.

When the filter cake is added to water, ammonium chloride dissolves, leaving the dithiourethanes either as a suspension or solution. This class of dithiourethanes has a varying solubility in water some being quite soluble while others are almost insoluble. However, the degree of solubility is of little importance. When the water is heated, temperatures of 50° to 100° C. being desirable in most instances to carry out rapidly the transformation to mercaptothiazoles, the dithiourethanes usually are soluble and momentarily go into solution. If the dithiourethanes are soluble, an oil layer, consisting of mercaptothiazoles comes down almost immediately. By vigorous agitation, the mercaptothiazoles are caused to crystallize as a finely-divided suspension.

A wide variety of organic solvents may be used as reaction diluents for preparing dithiourethanes. Water insoluble organic solvents are the preferred class. Even under the most favorable conditions, a small amount of mercaptothiazole is formed during the reaction and dissolves in the organic solvent, except when aliphatic hydrocarbons are used as diluents. The recovery of the mercaptothiazole from solution in the solvent is best accomplished by extracting with a solution of an alkali. The alkaline extract is then acidified to precipitate the mercaptothiazole.

Esters, as isopropyl acetate; cyclic ethers, as dioxane; halogenated solvents, as carbon tetrachloride; ketones, as methyl isobutyl ketone; alcohols, as amyl alcohol; hydrocarbons, as benzene, are useful diluents. Aliphatic hydrocarbons as hexanes, gasolines, etc., and mixtures of aliphatic and aromatic hydrocarbons have an added advantage that any mercaptothiazole formed along with the dithiourethane, is insoluble. An alkali extraction is thus not necessary. Ethyl ether is less desirable due to the difficulty of using such a low boiling solvent for commercial production without excessive evaporation losses. The same solvent may be used repeatedly in the process without need of purification as by distillation.

The same equipment may be used for both steps in the process although the second reaction where the dithiourethane is heated in water may be carried out in an open vessel, as a wooden tub, heat being supplied by passing in live steam.

The preparation of the dithiourethane is preferably carried out in a reactor provided with a reflux condenser, an agitator, and a device for regulating the temperature, as a jacket for circulating steam or cold water.

One molecular proportion of ammonium dithiocarbamate is suspended in the organic diluent, five parts by weight of the solvent to one part ammonium dithiocarbamate being a convenient concentration. One molecular proportion of the alpha halogenated ketone or alpha halogenated beta ketonic ester is added. The suspension is agitated and gradually warms as the reaction takes place with the formation of a dithiourethane and ammonium chloride. The time and temperature required for the reaction to go to completion, without the formation of an appreciable amount of mercaptothiazole, must be determined for each alpha halogenated compound used.

When the reaction is complete, the suspension is filtered. The filter cake, consisting of the dithiourethane and ammonium chloride is dried and added to water, or may be added to water without drying if desired. The volume of water used is two or three times the weight of the filter cake.

The suspension or solution of the dithiourethane in water is heated, 50° to 100° C. being the desirable temperature range. The dithiourethane is transformed into a mercaptothiazole, water being split off. After cooling to room temperature, the slurry is filtered, washed with cold water and dried at room temperature.

The organic solvent filtrate after the removal of dithiourethane and ammonium chloride is extracted with an alkali solution if it contains an appreciable amount of mercaptothiazole. The alkaline extract is acidified whereupon the mercaptothiazole is precipitated and is filtered off and dried.

The following example describes the process more specifically, but it will be understood the invention is not limited to these details. Wide variations both in the process and amounts of reactants are possible without materially affecting the results.

*Example*

62 g. of phenacyl chloride are added to a suspension of 44 g. of ammonium dithiocarbamate in 300 cc. of isopropyl acetate. The suspension is agitated in a flask provided with a reflux condenser and a thermometer.

A gradual increase in temperature is observed over a period of about one hour. The reaction is allowed to take its course without cooling. After about two hours the precipitate is filtered off and dried. The product consists of 5-phenacyl dithiourethane and ammonium chloride. The isopropyl acetate filtrate also contains ammonium chloride and a small amount of 2-mercapto 4-phenylthiazole.

The dry filter cake is added to 200 cc. of water, and the resulting suspension is heated to boiling. After standing for several hours the slurry is filtered and dried. The dry weight is 68.7 g. and the melting point 167°–168° C.

The isopropyl acetate from the filtration of the dithiourethane is extracted with 50 cc. of 20% sodium hydroxide solution. This extract is acidified to precipitate the mercaptothiazole. The product is filtered off and dried. The dry weight is 3.1 g. and the melting point is 166°–168° C.

The total weight of 2-mercapto 4-phenylthiazole obtained is 71.8 g. representing a 91.8% yield.

From the data herein presented, the fact will be readily apparent that this invention constitutes an advantageous, economical process for the manufacture of mercaptothiazoles.

Good yields of high purity mercaptothiazoles are obtainable, the purity of the crude product being such that for commercial use further purification is not necessary. The mercaptothiazoles are obtained directly in a finely-divided condition, making grinding unnecessary.

Both reactions are easily controlled and may be carried out in readily available standard equipment.

Organic solvents employed in the first reaction may be used several times without purifying. When the amount of dissolved impurities is such as to require purification, a distillation suffices. Solvent losses in the process are small. Inexpensive solvents may be employed.

Ammonium chloride formed as a by-product is readily eliminated by the second reaction being retained in the mother liquor.

I claim:

1. A process for the manufacture of a mercaptothiazole which comprises reacting in an organic solvent a substance from the group consisting of ammonium and alkali metal dithiocarbamates and an alpha halogenated organic compound having the formula

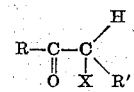

where R is a hydrocarbon group which may be joined to R'; R' is a member of the class consisting of hydrogen, alkyl groups which may be joined to R, and carbalkoxy groups; and X is halogen, to form a dithiourethane, separating the dithiourethane from the solvent, and heating it in water until it is converted to the corresponding mercaptothiazole.

2. A process for the manufacture of a mercaptothiazole which comprises reacting in an organic solvent ammonium dithiocarbamate and an alpha halogenated ketone to form a dithiourethane, separating the dithiourethane from the solvent, and heating it in water until it is converted to the corresponding mercaptothiazole.

3. A process for the manufacture of a mercaptothiazole which comprises reacting in an organic solvent substantially equi-molecular proportions of ammonium dithiocarbamate and an alpha halogenated ketone to form a dithiourethane, separating the dithiourethane from the solvent, and heating it in water until it is converted to the corresponding mercaptothiazole.

4. A process according to claim 3 in which the product is removed from the water by filtration.

5. A process for the manufacture of a mercaptothiazole which comprises reacting in a liquid ester ammonium dithiocarbamate and an alpha halogenated ketone to form a dithiourethane, separating the dithiourethane from the ester, and heating it in water until it is converted to the corresponding mercaptothiazole.

6. A process for the manufacture of a mercaptothiazole which comprises reacting in a liquid hydrocarbon ammonium dithiocarbamate and an alpha halogenated ketone to form a dithiourethane, separating the dithiourethane from the hydrocarbon, and heating it in water until it is converted to the corresponding mercaptothiazole.

7. A process for the manufacture of a mercaptoalkylthiazole which comprises reacting in an organic solvent ammonium dithiocarbamate and monochloroacetone to form a dithiourethane, separating the dithiourethane from the solvent, and heating it in water until it is converted to the corresponding mercaptothiazole.

8. A process for the manufacture of a mercaptoalkylthiazole which comprises reacting in an organic solvent ammonium dithiocarbamate and 3-chlorobutanone-2 to form a dithiourethane, separating the dithiourethane from the solvent, and heating it in water until it is converted to the corresponding mercaptothiazole.

9. A process for the manufacture of a mercaptoalkylthiazole which comprises reacting in an organic solvent ammonium dithiocarbamate and a mixture of 3-chlorobutanone-2 and 1-chlorobutanone-2 to form a dithiourethane, separating the dithiourethane from the solvent, and heating it in water until it is converted to the corresponding mercaptothiazole.

10. A process for the manufacture of a mercaptoalkyl thiazole which comprises reacting in a liquid hydrocarbon ammonium dithiocarbamate and a mixture of 3-chlorobutanone-2 and 1-chlorobutanone-2 to form a dithiourethane, separating the dithiourethane from the solvent, heating it in water until it is converted to the corresponding mercaptothiazole and recovering the product from the water by filtration.

ROGER A. MATHES.